(12) United States Patent
Krasnov et al.

(10) Patent No.: US 6,921,464 B2
(45) Date of Patent: Jul. 26, 2005

(54) METHOD OF MANUFACTURING A THIN FILM BATTERY

(75) Inventors: Victor Krasnov, Tarzana, CA (US);
Kai-Wei Nieh, Monrovia, CA (US);
Su-Jen Ting, Encino, CA (US)

(73) Assignee: Front Edge Technology, Baldwin Park, CA (US)

( * ) Notice: Subject to any disclaimer, the term of this patent is extended or adjusted under 35 U.S.C. 154(b) by 0 days.

(21) Appl. No.: 10/639,206

(22) Filed: Aug. 12, 2003

(65) Prior Publication Data

US 2004/0064937 A1 Apr. 8, 2004

Related U.S. Application Data

(62) Division of application No. 09/656,012, filed on Sep. 7, 2000, now Pat. No. 6,632,563.

(51) Int. Cl.[7] .............................................. C23C 14/35
(52) U.S. Cl. ............................ 204/192.22; 204/192.15; 204/192.12; 427/115
(58) Field of Search ...................... 204/192.12, 192.15, 204/192.22; 427/115; 29/623.5

(56) References Cited

U.S. PATENT DOCUMENTS

| | | | |
|---|---|---|---|
| 3,530,007 A | 9/1970 | Golubovic | 136/89 |
| 4,543,444 A | 9/1985 | Kumada et al. | 501/92 |
| 5,019,467 A | 5/1991 | Fujiwara | 429/127 |
| 5,171,413 A | * 12/1992 | Arntz et al. | 204/192.15 |
| 5,338,625 A | 8/1994 | Bates et al. | 429/193 |
| 5,445,906 A | 8/1995 | Hobson et al. | 429/162 |
| 5,512,147 A | 4/1996 | Bates et al. | 204/192.15 |
| 5,597,660 A | 1/1997 | Bates et al. | 429/191 |
| 5,612,152 A | 3/1997 | Bates | 429/152 |
| 5,705,293 A | 1/1998 | Hobson | 429/162 |
| 5,705,297 A | 1/1998 | Warren | 429/244 |
| 6,168,884 B1 | 1/2001 | Neudecker et al. | 429/162 |
| 6,280,875 B1 | 8/2001 | Kwak et al. | 429/162 |

FOREIGN PATENT DOCUMENTS

| | | | |
|---|---|---|---|
| FR | 2403652 | 4/2003 | H01M/4/36 |
| JP | 59226472 | 12/1984 | H01M/10/36 |
| JP | 044073 | 2/2001 | H01G/4/33 |
| WO | 0221627 | 3/2003 | H01M/10/36 |
| WO | 0060689 | 10/2003 | H01M/10/36 |

OTHER PUBLICATIONS

Neudecker et al., "'Lithium–Free' Thin–Film Battery with In–Situ Plated Li Anode", Journal of the Electrochemical Society, Issue No 147(2) 517–523 (2000).

Donald M. Mattox, Handbook of Physical Vapor Deposition (PVD) Processing, Film Formation, Adhesion, Srvace Preparation and Contamination Control, 1998, pp. 127–135 and 343–364, Noyes Publications, Westwood New Jersey, U.S.A.

(Continued)

*Primary Examiner*—Steven Versteeg
(74) *Attorney, Agent, or Firm*—Ashok K. Janah; Janah & Associates

(57) ABSTRACT

In a method of manufacturing a thin film battery in a chamber, a target comprising $LiCoO_2$ is provided on a magnetron cathode in the chamber, and a substrate is placed facing the target. A process gas is introduced into the chamber and the process gas is energized to form a plasma to sputter the target to deposit $LiCoO_2$ on the substrate. An ion flux of from about 0.1 to about 5 $mA/cm^2$ is delivered from the plasma to the substrate to enhance the crystallinity of the deposited $LiCoO_2$ material on the substrate. The process gas is exhausted from the chamber. The target can also be made of other materials.

29 Claims, 3 Drawing Sheets

OTHER PUBLICATIONS

Roh N-S, et al., "Effects of deposition condition on the ionic conductivity and structure of amorphous lithium phosphorous oxynitrate thin film" Scripta Materialia, Dec. 17, 1999, pp. 43–49, vol. 42, No. 1. Elsevier, NY US.

Bolster, M-E, et al. "Investigation of lithium intercalation metal oxides for thermal batteries" Proceedings of the International Power Sources Symposium, Cherry Hill, Jun. 25–28, 1990, Jun. 25, 1990, pp. 136–140, vol. SYMP. 34, IEEE, New York, US.

Wagner AV., et al. "Fabrication and testing of thermoelectric thin film devices" Fifteenth International Converence on Thermoelectrics, Pasadena, CA, USA Mar. 26–29, 1996; Mar. 26, 1996, pp. 289–273, IEEE, New York, US.

Bates, J.B. et al "Preferred Orientation of Polycrystalline $LiCoO_2$ Films *Journal of Electrochemical Society*"; Issue No. 147(1) pp. 59–70 (2000).

U.S. Provisional Patent Application entitled, "Comprehensive Patent for the Fabrication of a High Volume, Low Cost Energy Products Such as Solid State Lithium Ion Rechargeable Batter, Supercapacitators and Fuel Cells"; filed Mar. 24, 2000; U.S. Appl. No. 60/191,774, Jenson, et al.

U.S. Provisional Patent Application entitled, "Apparatus and Method for Rechargeable Batteries and for Making and Using Batteries", U.S. Appl. No. 60/225,134, filed Aug. 14, 2000, Jenson.

U.S. Provisional Patent Application entitled, "Battery Having Ultrathin Electrolyte", U.S. Appl. No. 60/238,673, filed Oct. 6, 2000, Jensen et al.

* cited by examiner

METHOD OF MANUFACTURING A THIN FILM BATTERY

CROSS-REFERENCE

This application is a divisional of U.S. Pat. No. 6,632,563, application Ser. No. 09/656,012, filed Sep. 7, 2000, which is incorporated herein by reference in its entirety.

BACKGROUND

The invention relates to a method of manufacturing a thin film battery.

A thin film battery typically comprises a substrate having one or more thin films thereon, which may serve as, for example, current collectors, a cathode, an anode, and an electrolyte, that cooperate to store electrical charge to generate a voltage. The thin film batteries typically are less than about $\frac{1}{100}^{th}$ of the thickness of conventional batteries. The thin films are typically formed by thin film fabrication processes, such as for example, physical or chemical vapor deposition methods (PVD or CVD), oxidation, nitridation or electroplating. The substrate material is selected to provide good dielectric properties and good mechanical strength. Suitable substrate materials may include for example, oxides such as aluminium oxide and silicon dioxide; metals such as titanium and stainless steel; and semiconductors such as silicon.

However, conventional substrate materials often limit the ability of the battery to store electrical energy to achieve high energy density or specific energy levels. The energy density level is energy level per unit volume of the battery. The specific energy level is the energy level per unit weight of the battery. Conventional batteries typically achieve energy density levels of 200 to 350 Whr/l and specific energy levels of 30 to 120 Whr/l. However, it is desirable to have a thin film battery that provides higher energy density and specific energy levels to provide more power per unit weight or volume.

The ability to achieve higher energy levels is also enhanced by forming a crystalline cathode film on the substrate. The crystalline cathode film can also provide better charging and discharging rates. However, it is difficult to fabricate thin film batteries having crystalline cathode films on the substrate. Typically, the cathode is a thin film deposited on the substrate in the amorphous or microcrystalline form, and thereafter, crystallized by annealing at high temperatures. For example, an amorphous or microcrystalline film of $LiCoO_2$ is typically annealed at about 700° C. to obtain a crystalline $LiCoO_2$ cathode film. However, the higher annealing temperature constrains the types of materials that may be used to form the other thin films on the substrate. The other thin film materials should not, for example, soften, melt, oxidize, or inter-diffuse at annealing temperatures. The annealing process may also generate thermal stresses that arise from the difference in thermal expansion coefficient of the substrate, cathode, and current collector, resulting in delamination or peeling off of the thin films or even the entire thin film battery structure. Thus, conventional methods are often deficient in their ability to fabricate the crystalline cathode film of the thin film battery.

Thus it is desirable to have a thin film battery capable of providing relatively high energy density and specific energy levels. It is also desirable to reduce the temperatures of fabrication of the crystalline thin film materials, especially in the fabrication of cathode comprising $LiCoO_2$.

SUMMARY

In a method of manufacturing a thin film battery in a chamber, a target comprising $LiCoO_2$ is provided on a magnetron cathode in the chamber, and a substrate is placed facing the target. A process gas is introduced into the chamber and the process gas is energized to form a plasma to sputter the target to deposit $LiCoO_2$ on the substrate. An ion flux of from about 0.1 to about 5 $mA/cm^2$ is delivered from the plasma to the substrate to form a crystalline $LiCoO_2$ film on the substrate. The process gas is exhausted from the chamber. The target can also be made of other materials.

The plasma can be generated from the process gas by operating the magnetron cathode at a power density level of from about 0.1 to about 20 $W/cm^2$.

The ion flux can be obtained by maintaining the substrate at a potential of from about −5 to about −200 V to cause plasma ions to be attracted to the substrate in the desired ion flux ratio. The ion flux enhances the crystallinity of the deposited $LiCoO_2$ material on the substrate.

In one version, the substrate comprises mica, for example, a mica foil. The mica foil can be sized smaller than 100 microns to give a thin film battery having a high energy density.

DRAWINGS

These and other features, aspects, and advantages of the present invention will become better understood with reference to the following description, appended claims, and accompanying drawings, which illustrate embodiments of the present invention that may be used separately or in combination with one another, where:

DESCRIPTION

Figure 1:
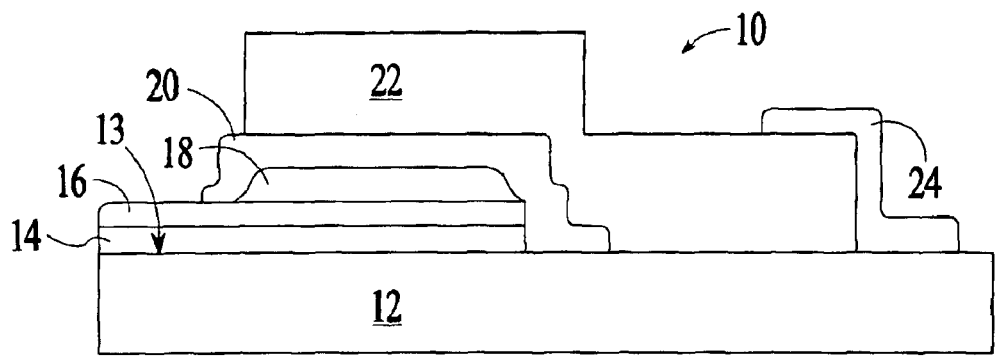
FIG. 1 is a schematic cross-sectional view of an embodiment of a thin film battery according to the present invention.

One embodiment of a battery 10 having features of the present invention is illustrated in FIG. 1. The battery 10 is formed on a substrate 12 which can be an insulator, a semiconductor, or a conductor. The substrate 12 should also have sufficient mechanical strength to support the thin films during processing or operational temperatures. For example, the substrate 12 can comprise silicon dioxide, aluminum oxide, titanium, or a polymer.

In one embodiment of the present invention, which may be used by itself, or in combination with any of the other features or methods described herein, the substrate 12 comprises a thickness of less than about 100 microns, and more preferably less than 25 microns. The thinner substrate 12 reduces the total weight and volume of the battery and yet is sufficiently strong to provide the desired mechanical support for the battery structure. A preferred substrate material comprises mica, which may be fabricated into a thin substrate of less than 100 microns with good tensile strength. Mica is typically a muscovite material, which is a layered silicate with a typical stoichiometry of $KAl_3Si_3O_{10}(OH)_2$. Mica typically has a flat six-sided monoclinical crystalline structure with good cleavage properties in the direction of the large planar surfaces. Because of this crystal structure, mica may be split into thin foils along its cleavage direction to provide thin substrates having surfaces 13 which are smoother than most chemically or mechanically polished surfaces, which is advantageous for the fabrication of thin films on the substrate. Chemically, mica is stable and inert to the action of most acids, water, alkalies and common solvents. Electrically, mica has good dielectric strength, a uniform, dielectric constant, and low electrical power loss factors. Mica is also stable at high temperatures of up to 600° C. By using mica, thin substrates may be fabricated to provide lighter and smaller batteries with relatively higher energy density levels. Mica also provides good physical and chemical characteristics for processing of the thin films formed on the substrate, in a CVD or PVD chamber, such as for example, a magnetron sputtering chamber.

Referring to FIG. 1, a typical battery 10 includes a first adhesion layer 14 deposited on the surface 13 of a substrate 12 to improve adhesion of the other thin films formed on the substrate 12. The adhesion layer 14 can comprise a metal such as, for example, titanium, cobalt, aluminum, other metals, or a ceramic material such as, for example, $LiCoO_x$, which may comprise a stoichiometry of $LiCoO_2$. A first current collector 16 is formed over the adhesion layer 14. The current collector 15 is typically a conductive layer which may comprise a non-reactive metal such as sliver, gold, platinum or aluminum. The first current collector 16 may also comprise, the same metal as the adhesion layer 14 in a thickness that is sufficiently high to provide the desired electrical conductivity.

A first electrode 18 comprising an electrochemically active material may be deposited over the first current collector 16. For example, the first electrode film 18 may comprise an amorphous vanadium pentoxide, $V_2O_5$, or one of several lithium intercalation compounds that may be deposited in thin-film form, such as crystalline $TiS_2$, $LiMn_2O_2$ or $LiCoO_2$. In one exemplary embodiment, a crystalline $LiCoO_2$ film is deposited upon the current collector 16 by RF or DC magnetron sputtering to serve as the first electrode or cathode. An electrolyte film 20 is formed over the first electrode 18. The electrolyte film 20 may be, for example, an amorphous lithium phosphorus oxynitride film otherwise known as a Lipon™ film, Dupont de Nemours, Wilmington, Del. An anode or second electrode 22 is deposited over the electrolyte film 20 and a second current collector 24 is deposited on the second electrode 22 and the substrate 12. Further layers may be formed to provide additional protection.

In yet another embodiment of the present invention, which also may be used by itself, or in combination with any of the other features or methods described herein, the first electrode film 18 comprises a crystalline lithium metal oxide film, such as a $LiCoO_2$ film. The crystalline $LiCoO_2$ film can be fabricated at low temperatures preferably below 600° C. by a PVD process, such as RF or DC magnetron sputtering with a high plasma density, as provided herein.

Figure 2:
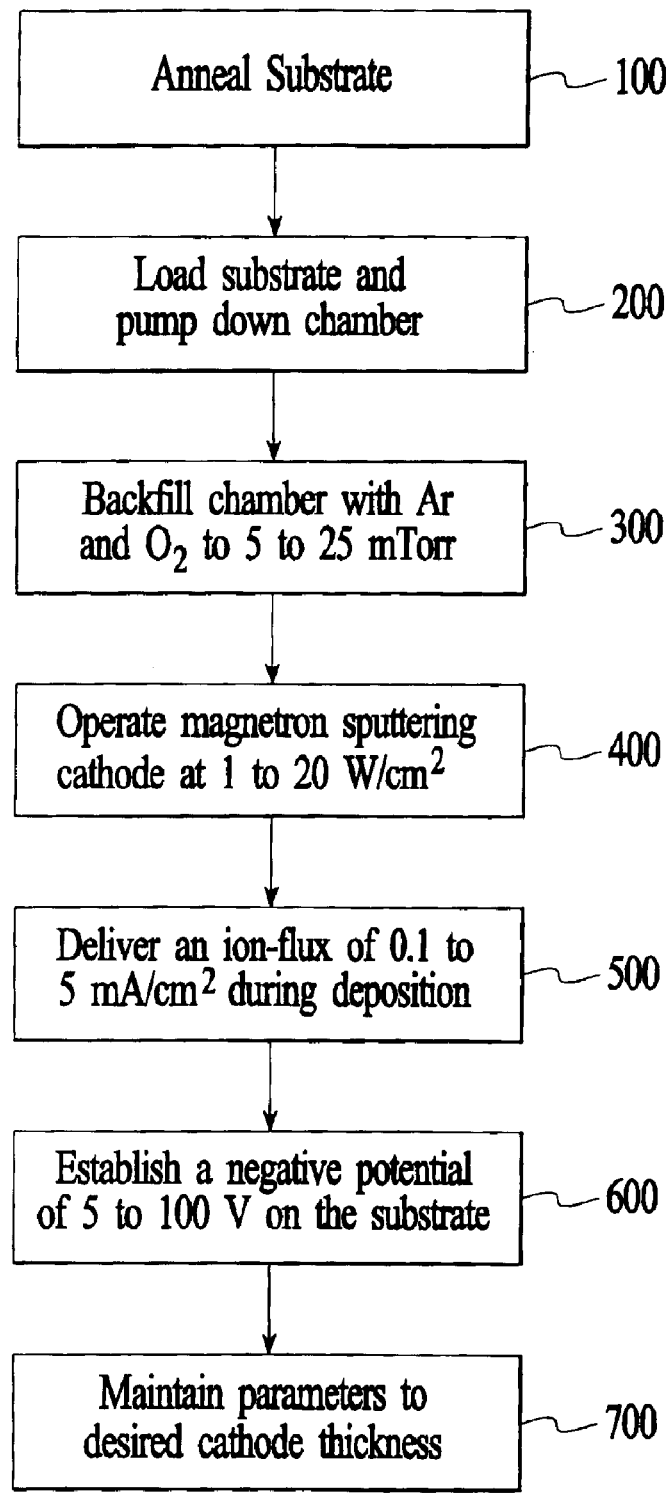
FIG. 2 is a flow chart of the method of fabricating a thin film battery according to another embodiment of the present invention.

FIG. 2 illustrates the method of making a thin film battery according to the present invention. In the initial step, step 100, the substrate is heated to about 400° C. in air for about 10 minutes to clean the substrate 12 by burning off organic materials which may be formed on the substrate 12. Subsequently, the thin film layers of the battery are deposited on the substrate 12. One or more of the thin films may be adapted to generate or store an electrical charge.

Figure 3:
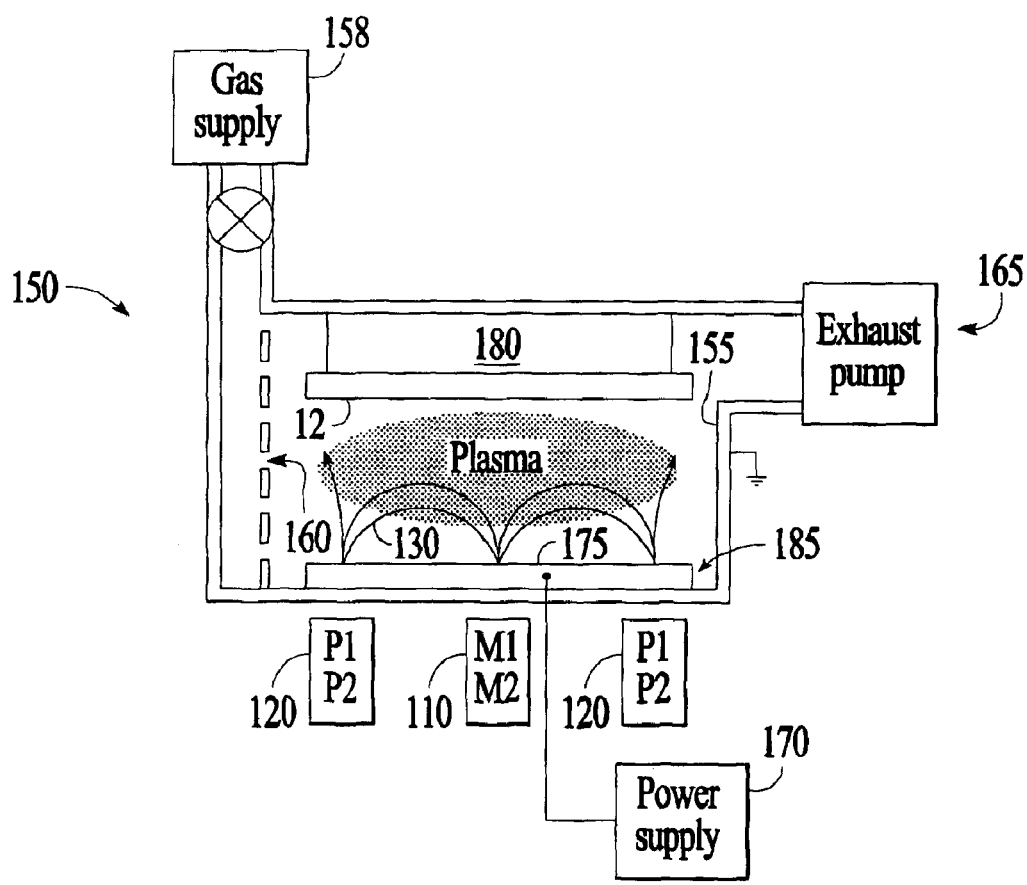
FIG. 3 is a schematic diagram of the structure of a magnetron sputtering cathode apparatus according to the present invention.

In one method, the substrate is placed in a magnetron PVD chamber 150 as shown in FIG. 3, which is pumped down to $1\times10^{-5}$ Torr, step 200. A suitable substrate comprises an array of 35 mm×62 mm sheets of mica. The chamber 150 comprises walls 155, a gas supply 158 connected to a gas distributor 160, a gas exhaust 165, and a power supply 170 to apply a power to a target 175. A substrate fixture 180 with the substrate 12 thereon is carried into the processing chamber 150 by a conveyor and positioned facing the target 175. The substrate holding fixture 180 is electrically isolated from the chamber walls 155 which are typically electrically grounded. The process chamber 150 is separated from a loading chamber (not shown) by a slit valve (also not shown). The process chamber 150 typically comprises a volume of about 24 sq ft with dimensions of about 4'×6'×1'. The sputtering targets 175 are sized about 5"×25". The process gas distributor 160 is provided for distributing process gas into the chamber 150. A process gas, such as for example, argon and oxygen, may be introduced into the chamber 150 to serve as the sputtering gas. The sputtering gas is maintained in the chamber 150 at a pressure of from about 5 to about 25 mTorr, in step 300, and provided at a flow rate ratio of $Ar/O_2$ of from about 1 to about 45.

A high density plasma is generated in the chamber 150 by a magnetron sputtering cathode 185. The plasma is formed over an area that is sufficiently large to coat the entire substrate 12, for example, an area of about 8"×about 25". In one version, the magnetron cathode 185 comprises central magnets 110 that provide a weaker magnetic field than the surrounding peripheral magnets 120. Both the peripheral and central magnets, 110, 120 have a polarity of south facing the chamber 150 and north facing away from the chamber 150. In this configuration, the magnetic field 130 generated by the magnets 120 is not confined to near the magnetron cathode surface 185. Instead, the magnetic field lines 130 extend to near the substrate 12. Secondary electrons follow the magnetic field lines to near the substrate surface to create high-density plasma in this area. In one version, the magnets 120 are arranged about a perimeter of the target 175. Thus, the distribution of plasma ions about the substrate 12 may be controlled with the magnetic field 130.

To deposit a film of $LiCoO_x$ on the substrate 12, a target 175 comprising $LiCoO_2$ is installed in the chamber 150 and the magnetron-sputtering cathode 185 is operated at a power density level of from about 0.1 to about 20 $W/cm^2$, step 400. In conjunction with operating the cathode 185, an ion flux of from about 0.1 to about 5 $mA/cm^2$ is delivered to the substrate 12 upon which the $LiCoO_x$ film is being deposited, step 500. During deposition, a negative potential of 5 to 100 V on the substrate 12 is established with respect to the plasma, step 600. The potential can be established either by using an external power supply or by electrically floating the substrate holding fixture 180. The parameters of the deposition process are maintained until the desired film thickness is reached, step 700. The temperature of the substrate 12 during the deposition process is estimated to be from about 100 to about 200° C.

Figure 4:
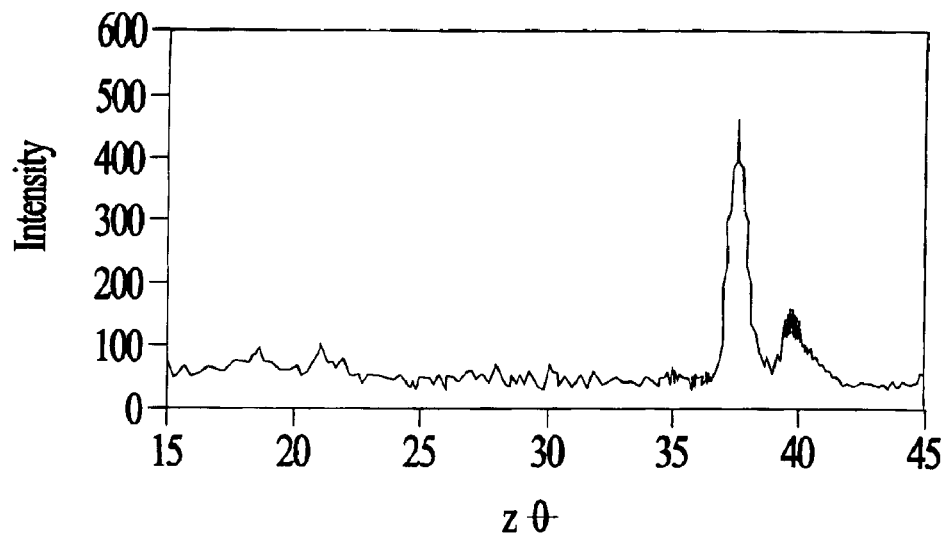
FIG. 4 is an x-ray diffraction pattern of an as-deposited $LiCoO_2$ film showing that the film is highly crystalline and with a (110) preferred orientation.

In one version the as-deposited $LiCoO_x$ film fabricated according to the present method comprises $LiCoO_2$ which is crystalline with a strong (101) preferred orientation and with a small amount of (012) oriented grains. FIG. 4 shows a typical x-ray two theta diffraction pattern of the as-deposited $LiCoO_2$ film showing that the film is highly crystalline and with a (101) preferred orientation. The substrate 12 was slightly tilted when taking x-ray diffraction in order to suppress the diffraction peaks from the mica substrate to better reveal the property of the LiCoO$_2$ film. It is believed that the crystalline material was deposited due to a combination of plasma heating, oxygen activation and plasma enhanced nucleation and growth processes. The as deposited crystalline material was a good cathode material.

Optionally, the cathode film formed on the substrate may be annealed to further improve the quality of the cathode film. The annealing step was found to increase the battery capacity by 10 to 20%, increase the charge and discharge current by more than 50%, and improve the resistance to moisture. These attributes arise from the elimination of point defects and the reduction of electrical contact resistances in the cathode material.

Under lower gas pressure levels of about 5 mTorr, the preferred orientation changes to (012) and (104). The (012) and (104) oriented material can still be used as cathode, however, with smaller energy capacity compared to the (101) oriented material. The annealing process is typically performed at a low temperature of from about 150 to about 600° C.

Figure 5:
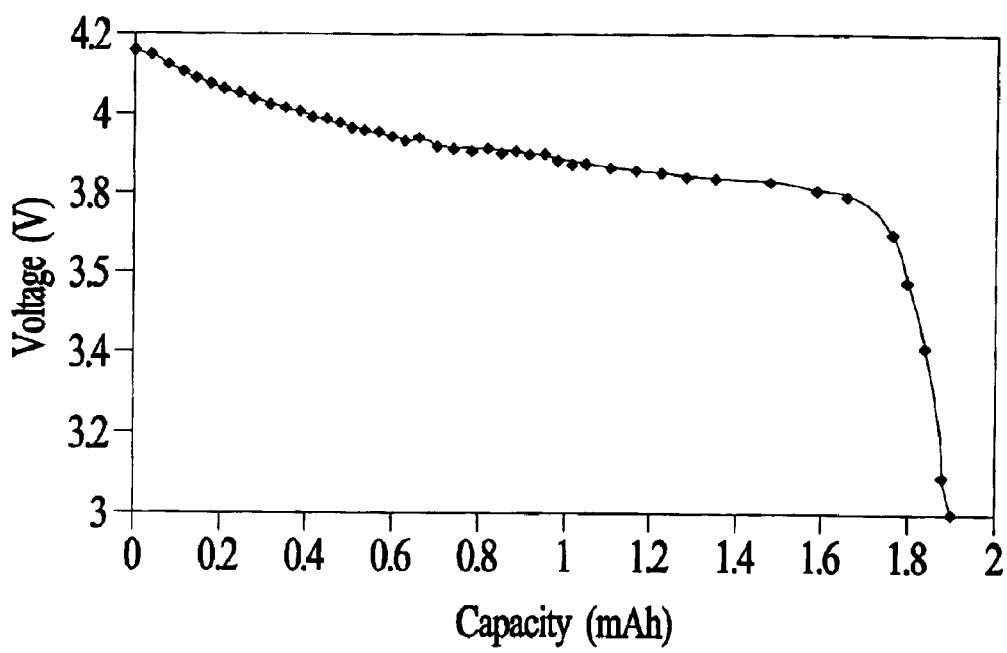
FIG. 5 is a discharge curve of a thin film battery according to the present invention having a crystalline $LiCoO_2$ cathode.

FIG. 5 is a typical discharge curve of a 15 cm$^2$ thin film battery of the present invention. The battery comprised a 10 m-thick mica substrate with a crystalline LiCoO$_2$ cathode layer that is close to 2 $\mu$m. The capacity of the battery, as shown in FIG. 5, is about 1.9 mAh. Thus, the capacity of the cathode is calculated to be 0.07 mAh/cm$^2$/$\mu$m, which is close to the theoretical number for crystalline LiCoO$_2$. The cut off voltage of this battery is well defined and at 3.7 V. The energy density and specific energy of this thin film battery, including both the cell and the substrate, is about 340 wh/l and 105 wh/kg, respectively. It is expected that an energy density of more than 700 wh/l and a specific energy of more than 250 wh/kg can be achieved by fabricating the battery cell on both front and back side of a mica substrate. The discharge current of the battery was about 2 mA.

It will be understood that numerous modifications and substitutions can be made to the described exemplary embodiments of the present invention without departing from the scope of the invention. For example, thin film electronic devices other than batteries may be fabricated using the described substrate. Also, the battery can include other combinations of metal, nonmetal and dielectric layers and in a different order than that described herein. Accordingly, the exemplary embodiments are intended for the purpose of illustration and not as a limitation.

What is claimed is:

1. A method of manufacturing a thin film battery in a chamber comprising a magnetron cathode, the method comprising:
   (a) providing a target on the magnetron cathode in the chamber;
   (b) placing a substrate comprising mica facing the target in a chamber;
   (c) introducing a process gas into the chamber;
   (d) energizing the process gas to form a plasma to sputter the target to deposit target material on the substrate;
   (e) delivering an ion flux from the plasma to the substrate of from about 0.1 to about 5 mA/cm$^2$ to enhance crystallization of the target material deposited on the substrate; and
   (f) exhausting the process gas from the chamber.

2. A method according to claim 1 wherein (a) comprises providing a target capable of depositing on the substrate, a film comprising LiCoO$_2$.

3. A method according to claim 1 comprising applying a current at a power density level of from about 0.1 to about 20 W/cm$^2$ to the target while maintaining the substrate at a potential of from about −5 to about −200 V.

4. A method according to claim 1 wherein the substrate comprises mica having a thickness of less than about 100 microns.

5. A method according to claim 4 further comprising forming films on the mica substrate, the films comprising a first and second current collectors, an anode, and an electrolyte, such that the deposited target material serves as the cathode.

6. A method of manufacturing a thin film battery in a chamber comprising a magnetron cathode, the method comprising:
   (a) providing a target on the magnetron cathode in the chamber, the target capable of depositing on a substrate, a lithium metal oxide film;
   (b) placing a substrate facing the target in a chamber;
   (c) introducing a process gas into the chamber;
   (d) energizing the process gas to form a plasma to sputter the target to deposit the lithium metal oxide film on the substrate;
   (e) delivering an ion flux from the plasma to the substrate of from about 0.1 to about 5 mA/cm$^2$ to form a crystalline lithium metal oxide film on the substrate; and
   (f) exhausting the process gas from the chamber.

7. A method according to claim 6 wherein the target is capable of depositing on a substrate, a lithium motel oxide film comprising LiCoO$_x$.

8. A method according to claim 6 wherein the target is capable of depositing on a substrate, a lithium metal oxide film comprising LiCoO$_2$.

9. A method according to claim 6 wherein the target is capable of depositing on a substrate, a lithium metal oxide film comprising LiMn$_2$O$_2$.

10. A method according to claim 6 comprising operating the magnetron cathode at a power density level of from about 0.1 to about 20 W/cm$^2$ and maintaining the substrate at a potential of from about −5 to about −200 V.

11. A method according to claim 6 further comprising applying a non-uniform magnetic field about the target in the chamber comprising a weaker central magnetic field strength and a surrounding stronger peripheral magnetic field strength.

12. A method according to claim 6 comprising introducing a process gas comprising argon and oxygen and maintaining the process gas in the chamber at a pressure of from about 5 to about 25 mTorr.

13. A method according to claim 6 comprising annealing the deposited lithium metal oxide film by heating the substrate to a temperature from about 150 to about 600° C.

14. A method according to claim 6 comprising the initial step of forming a substrate comprising mica, and forming one or more films on the substrate to generate or store an electrical charge.

15. A method according to claim 14 wherein the mica substrate comprises a thickness of less than about 100 microns.

16. A method according to claim 14 further comprising forming films on the mica substrate, the films comprising a first and second current collectors, an anode, and an electrolyte, such that the deposited crystalline lithium metal oxide film serves as the cathode.

17. A method according to claim 6 further comprising cleaning the substrate before depositing lithium metal oxide film on the substrate.

18. A method according to claim 17 comprising cleaning the substrate by heating the substrate to about 400° C. in air.

19. A method of manufacturing a thin film battery in a chamber comprising a magnetron cathode, the method comprising:
(a) providing a target on the magnetron cathode in the chamber, the target capable of depositing on a substrate, a $LiCoO_x$ film;
(b) placing a substrate facing the target in a chamber;
(c) introducing a process gas into the chamber;
(d) energizing the process gas with RF of DC energy with RF or DC energy to form a plasma to sputter the target to deposit the $LiCoO_x$ film on the substrate;
(e) delivering an ion flux from the plasma to the substrate of from about 0.1 to about 5 $mA/cm^2$ to form a crystalline $LiCoO_x$ film on the substrate; and
(f) exhausting the process gas from the chamber.

20. A method according to claim 19 wherein the target is capable of depositing on a substrate, a $LiCoO_x$ film comprising $LiCoO_2$.

21. A method according to claim 19 comprising operating the magnetron cathode at a power density level of from about 0.1 to about 20 $W/cm^2$ and maintaining the substrate at a potential of from about −5 to about −200 V.

22. A method according to claim 19 further comprising applying a non-uniform magnetic field about the target in the chamber comprising a weaker central magnetic field strength and a surrounding stronger peripheral magnetic field strength.

23. A method according to claim 19 comprising introducing a process gas comprising argon and oxygen and maintaining the process gas in the chamber at a pressure of from about 5 to about 25 mTorr.

24. A method according to claim 19 comprising annealing the deposited $LiCoO_x$ film by heating the substrate to a temperature from about 150 to about 600° C.

25. A method according to claim 19 comprising the initial step of forming a substrate comprising mica, and forming one or more films on the substrate to generate or store an electrical charge.

26. A method according to claim 25 wherein the mica substrate comprises a thickness of less than about 100 microns.

27. A method according to claim 25 further comprising forming films on the mica substrate, the films comprising a first and second current collectors, an anode, and an electrolyte, such that the deposited crystalline $LiCoO_x$ film serves as the cathode.

28. A method according to claim 19 further comprising cleaning the substrate before depositing the $LiCoO_x$ film on the substrate.

29. A method according to claim 28 comprising cleaning the substrate by heating the substrate to about 400° C. in air.

* * * * *